July 21, 1959　　W. E. DE BARRIE　　2,895,752
ADJUSTABLE FITTING
Filed Jan. 16, 1956
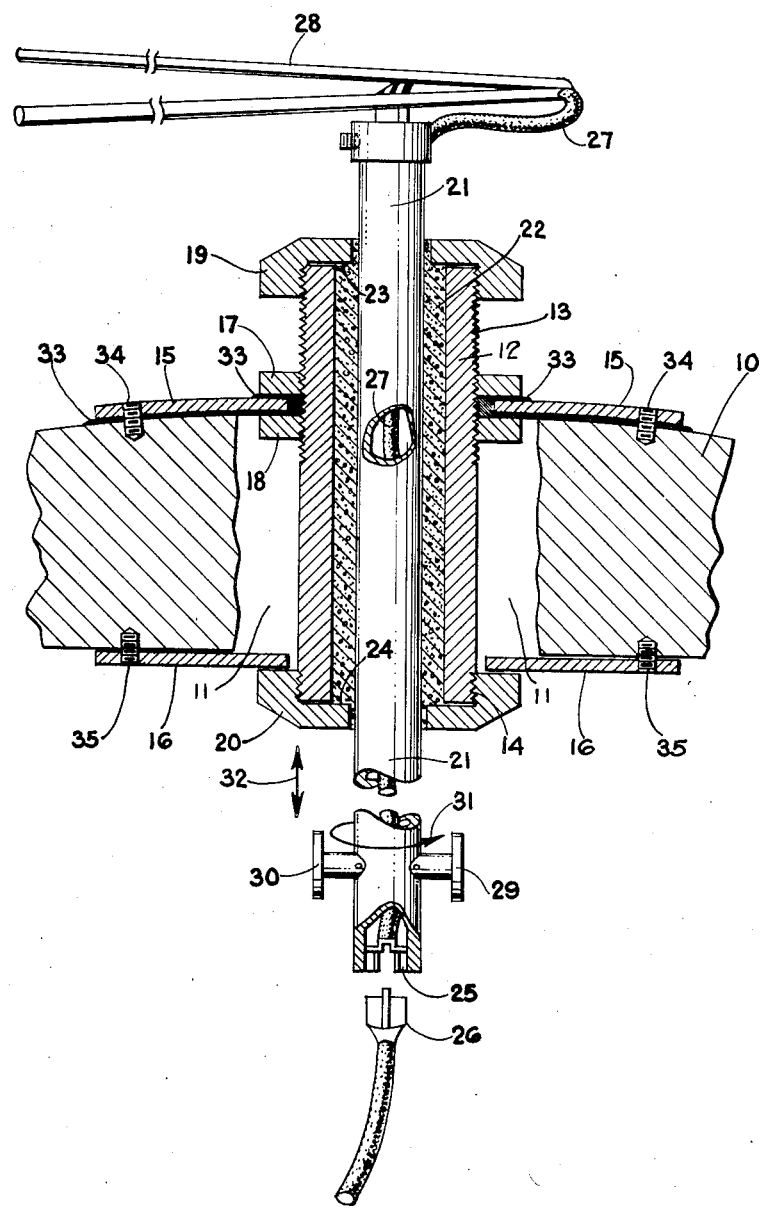
INVENTOR.
WILLIAM E. DE BARRIE
BY Elliott & Pastoriza
ATTORNEYS

United States Patent Office 2,895,752
Patented July 21, 1959

2,895,752

ADJUSTABLE FITTING

William E. De Barrie, Los Angeles, Calif.

Application January 16, 1956, Serial No. 559,246

1 Claim. (Cl. 287—20)

This invention relates generally to adjustable fittings and more particularly to a weather tight fitting for finishing off an opening in a partition or wall through which tubes or pipes and the like pass.

A preferred application of the fitting assembly of this invention is in connection with an antenna support for positioning an antenna on an automobile house trailer wherein an opening is made in the roof of the trailer. Other uses for the adjustable fitting, however, will occur to those skilled in the art.

General objects of the present invention are to provide a weather tight fitting which is rugged and simple in construction, and which may be easily and quickly installed by unskilled personnel.

More particularly, it is an object of this invention to provide a sleeve type fitting having means for adjusting the fitting to different thicknesses of roofs or partitions to which it is secured whereby an end of the opening through which the fitting projects may be finished off in a neat appearing manner.

Still another important object is to provide a fitting of the above type which will fritcionally retain an antenna supporting tube member passing therethrough in any desired manually set rotative and axial position, whereby an exterior antenna may be easily adjusted for maximum reception from an interior location.

These and other objects and advantages of this invention are attained by providing a sleeve member adapted to be received in a partition or roof opening and extend from either side thereof. An apertured retaining plate is receivable over one end of the sleeve and has an area sufficient to cover the peripheral portions of one side of the opening. Means are provided on the sleeve for securing this retaining plate at desired axial positions depending on the thickness of the partition or roof opening, whereby a predetermined portion of the sleeve projects from the other side of the opening. This predetermined portion is of a given length for accommodating an apertured finishing plate which is receivable on this sleeve portion and which is similarly of an area sufficient to cover the peripheral portions of the opening. Securing means are provided for fastening the retaining and the finishing plates to the opposite surfaces of the partition or roof respectively. The arrangement is such that the end of the fitting including the finishing plate, always presents a neat appearance. This feature is particularly desirable in the preferred embodiment of the fitting in automobile house trailers.

In the preferred embodiment in which the fitting is employed to support a trailer antenna, there is provided an elongated tubular member, of outside diameter less than the inside diameter of the sleeve, arranged to pass through the sleeve to leave an annular space in the sleeve. This annular space is filled with packing or stuffing material which serves to frictionally retain the tubular supporting member in any desired axial or rotative position. End nuts are provided on the sleeve with end openings accommodating the tubular member but of lesser diameter than the inside diameter of the sleeve whereby annular shoulders are provided at the ends of the sleeve for retaining the packing material within the annular space. By employing a relatively elongated sleeve, a relatively long annular space is provided for the packing material whereby proper support and friction on the tubular member passing through the sleeve may be provided and thus enable desired manual adjustments as to the axial position of the supporting tube and its rotative position within the sleeve, to be achieved.

The supporting tubular member is provided at its upper end above the roof of the trailer with an antenna and at its lower end, with a lateral projection serving as a means for indicating the relative rotative position of the tubular support and antenna so that a person within the trailer may know the direction in which the antenna is directed.

A better understanding of the invention will be had by referring to the preferred embodiment thereof as shown in the accompanying drawing which is a single cross-sectional view of the adjustable fitting positioned in an opening in the roof of an automobile house trailer.

Referring to the drawing, there is shown a portion of a house trailer roof 10 provided with an opening 11. The thickness of the roof 10 and thus the length of the opening 11 may vary over small amounts for different types of trailers.

The adjustable fitting of the present invention comprises a sleeve member 12 provided with threads 13 and 14 at its upper and lower ends respectively. The threads 13 extend over a greater axial length than the threads 14; however, if desired, the entire sleeve may be threaded. Positioned over the threads 13 of the sleeve 12 is an apertured retaining plate 15. Similarly an apertured finishing plate 16 is positioned over the lower end of the sleeve. As shown in the drawing, the retaining plate 15 is secured in a desired axial position on the sleeve 12 by means of two lock nuts 17 and 18 on either side of the plate 15. These lock nuts are threaded on the threads 13 and serve to position the retaining plate 15 in accordance with the thickness of the roof opening 11.

A pair of end nuts 19 and 20 are adapted to be threaded over the ends of the sleeve 12 and each are provided with openings for receiving a tubular support member 21 passing axially through the sleeve. The support member 21 has an outside diameter which is less than the inside diameter of the sleeve to leave an annular space in the sleeve which is filled with a stuffing or packing material 22. The material 22 is preferably impregnated with graphite to provide a desired friction characteristic with the exterior of the tube 21 and permit the tube 21 to be manually moved axially through the sleeve or rotatively about its axis, within the sleeve.

The openings in the end nuts 19 and 20 are of greater diameter than the tube 21 but of lesser diameter than the inside diameter of the sleeve 12 whereby annular shoulders 23 and 24 are respectively provided for retaining the packing material 22 within the annular space in the sleeve 12.

In the embodiment chosen for illustrative purposes, the supporting tubular member 21 serves as a combined antenna support and means for passing a transmission line from a television set within the trailer through the roof of the trailer to the antenna. As shown, the lower end of the tube 21 is provided with a female jack 25 adapted to receive a male plug 26 leading to the antenna terminals in a television set. From the female jack 25 a transmission line 27 passes up through the tube 21 to an antenna 28 supported in any suitable manner to the upper end of the tube 21. Since the support tube 21 is held only by its frictional engagement with the packing 22, and the packing is such as to permit manual movement of the tube 21, the antenna 28 may be positioned from within the trailer at any desired height and azimuth direction. In order to determine the orientation of the antenna from within the trailer, the lower end of the support tube 21 may be provided with lateral projections 29 and 30. These projections will extend in the same direction as the antenna when the tube 21 is rotated as indicated by the arrow 31. The vertical adjustment of the antenna is accomplished by simply sliding the tube 21 axially through the sleeve fitting as indicated by the arrow 32. The tube 21 may normally be six or seven feet long so that the antenna may be raised to a practical height above the trailer.

In the installation and operation of the adjustable fitting, the thickness of the hole 11 in the roof 10 is first measured. The retaining plate 15 and lock nuts 17 and 18 are then axially positioned on the sleeve 12 such that a given length of sleeve projects below the lower end of the opening 11 when the plate 15 is resting on the roof. This length is determined such that when the end nut 20 and finishing plate 16 are secured in position, they will be in proper engagement with the end of the sleeve 12 and peripheral portions of the lower edge of the opening 11 to hide the threads 14 on the sleeve as shown in the drawing.

The lock nuts 17 and 18, on either side of plate 15, are then tightened and calking putty 33 or the like is applied about the locking nuts 17 and 18 and applied to the underside of the retaining plate 15. The sleeve 12 is then inserted from the roof through the opening 11 so that the retaining plate 15 covers the upper peripheral edges of the opening 11. Preferably, the plate 15 is sufficiently flexible to enable it to be securely screwed down to the top of the roof and conform to any curved shape of the roof. Screws 34 may be provided for this purpose. The calking putty or other weather proofing material about the retaining nuts 17 and 18 and under the retaining plate 15 insure a weather tight seal.

The lateral projections 29 and 30 are removed from the tubular support member 21 which is passed down through the sleeve 12. Packing material may then be stuffed in the annular space for frictionally retaining the tube 21 within the sleeve, and the upper end nut 19 threaded onto the sleeve end. The antenna 28 may then be secured to the top of the tube 21 and the transmission line 27 passed down through the interior of the tube and connected to the female jack 25. The lower finishing plate 16 is then placed over the protruding end of the sleeve 12 and secured to the trailer ceiling about the hole 11 as by screws 35. The second end nut 20 is then passed over the end of the tube 21 and threaded on the lower portion of the sleeve 12 whereby the packing material 22 is retained within the annular space in the sleeve.

The direction indicating lateral projections 29 and 30 are then secured to the support 21 and the male plug 26 leading from the television set may be inserted in the female jack 25 to complete the assembly.

The arrangement as described above wherein the upper retaining plate 15 may be axially positioned along the sleeve 12 enables accommodation of the fitting to different thicknesses of openings or partitions without changing the overall length of the sleeve 12. A certain minimum overall length of sleeve is desirable in order to provide sufficient support and stability for the tube 21 and the proper amount of friction between the exterior surface of the tube 21 and the packing material 22 within the sleeve. Regardless of the thickness of the roof, however, because of the adjustability of the retaining plate 15, the lower end of the sleeve projecting through the bottom of the opening will always be of the proper length so that application of the finishing plate 16 and lower end nut 20 will always result in a neat appearance from the inside of the trailer.

It will thus be apparent that the present invention provides a simple and rugged adjustable fitting which may be easily installed on conventional type automobile house trailers.

Modifications of the adjustable fitting falling within the scope and spirit of the present invention will occur to those skilled in the art. The invention is therefore not to be thought of as limited to the particular embodiment chosen for illustrative purposes.

What is claimed is:

An antenna support fitting for use in an automobile house trailer for supporting an antenna on the roof of the trailer and enabling positioning of the antenna from the interior of the trailer through an opening in the roof of said trailer, said fitting comprising: a sleeve member dimensioned to pass through said opening in said roof; an apertured retaining plate surrounding said sleeve to cover the peripheral portions of the upper end of said opening; two lock nuts threaded on said sleeve on either side of said retaining plate axially positioning said sleeve so that a given length of sleeve extends into the interior of said trailer; means for securing said retaining plate in weather tight engagement with the roof of said trailer; an apertured finishing plate surrounding the end of said sleeve within said trailer; means for securing said finishing plate to the inside of said roof; a tubular member passing axially through said sleeve and having an outside diameter less than the inside diameter of said sleeve to leave an annular space in said sleeve; packing material within said annular space; end nuts on the ends of said sleeve having openings of diameter greater than the outside diameter of said tubular member and less than the inside diameter of said sleeve to provide annular shoulders to confine said packing material within said annular space, said given length of sleeve extending into the interior of said trailer being less than the sum of the thicknesses of said finishing plate and the one of said end nuts secured to the lower end of said sleeve, whereby said lower end is concealed by said one of said end nuts, and laterally directed indicating means secured to the lower portion of said tubular member for indicating relative rotative positions thereof with respect to said sleeve; said tubular member providing a passage for a transmission line from the interior of said trailer to said antenna on the roof of said trailer; said packing material having limited frictional engagement with the exterior of said tubular member whereby said tubular member may be axially and rotatively manually set to desired positions and retained in such position by said limited frictional engagement with said packing material.

References Cited in the file of this patent

UNITED STATES PATENTS

| | | |
|---|---|---|
| 182,906 | Drummond | Oct. 3, 1876 |
| 2,080,350 | Waldron | May 11, 1937 |
| 2,233,222 | Paton | Feb. 25, 1941 |
| 2,365,886 | Lehmann | Dec. 26, 1944 |
| 2,464,332 | Maund et al. | Mar. 15, 1949 |